No. 630,089. Patented Aug. 1, 1899.
J. W. NASMITH.
STEAM TRAP.
(Application filed Dec. 8, 1898.)
(No Model.) 2 Sheets—Sheet 1.

WITNESSES:
INVENTOR:

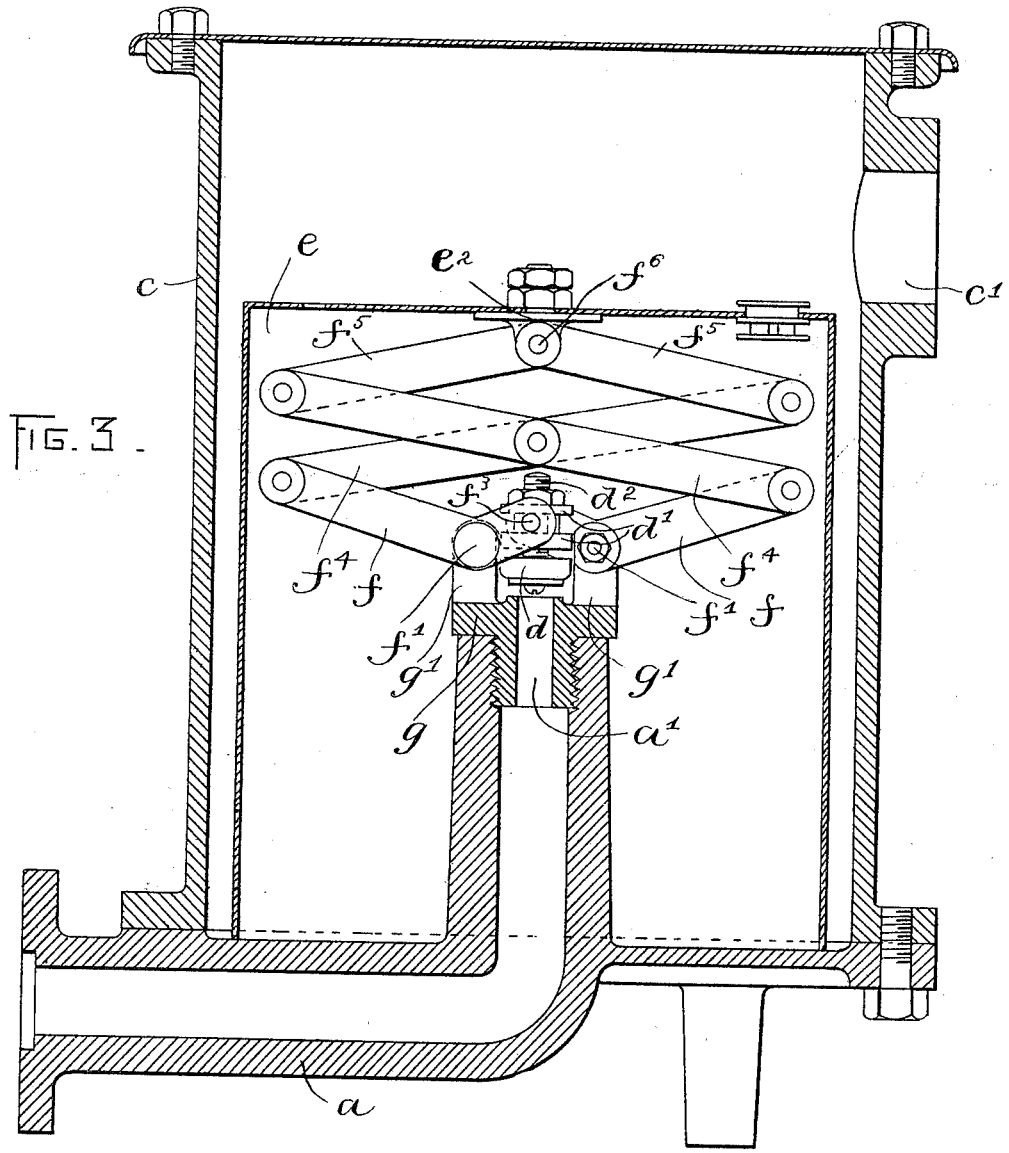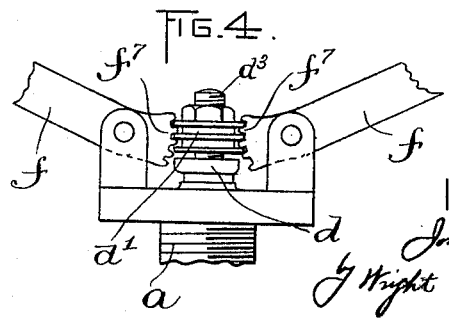

UNITED STATES PATENT OFFICE.

JOHN WILLIAM NASMITH, OF MANCHESTER, ENGLAND.

STEAM-TRAP.

SPECIFICATION forming part of Letters Patent No. 630,089, dated August 1, 1899.

Application filed December 8, 1898. Serial No. 698,615. (No model.)

*To all whom it may concern:*

Be it known that I, JOHN WILLIAM NASMITH, of Manchester, in the county of Lancaster, England, have invented certain new and useful Improvements in Steam-Traps, of which the following is a specification.

This invention is an improvement on the steam-trap shown in United States Letters Patent No. 608,384, granted to Victor Aimé Prost August 2, 1898, said trap comprising a water-receptacle, a conduit for steam and water entering the said receptacle and having an outlet therein, a float having a vertical movement in the receptacle and inclosing said outlet, a valve located within the float and adapted to open and close the outlet, and devices which coöperate with the float to operate the valve when said float rises and falls. In the trap shown in this patent the valve was carried at the lower end of a screw, and the float in rising and falling was caused to rotate in order to operate this screw, and thereby seat and unseat the valve. The necessary mechanism incident to this arrangement operated with considerable friction and would sometimes impair the perfect working of the trap.

It is the object of the present invention to reduce this friction and also to provide a compact valve-operating mechanism inclosed within the movable float.

The invention consists in the improvements which I shall now proceed to describe and claim.

Figure 1:
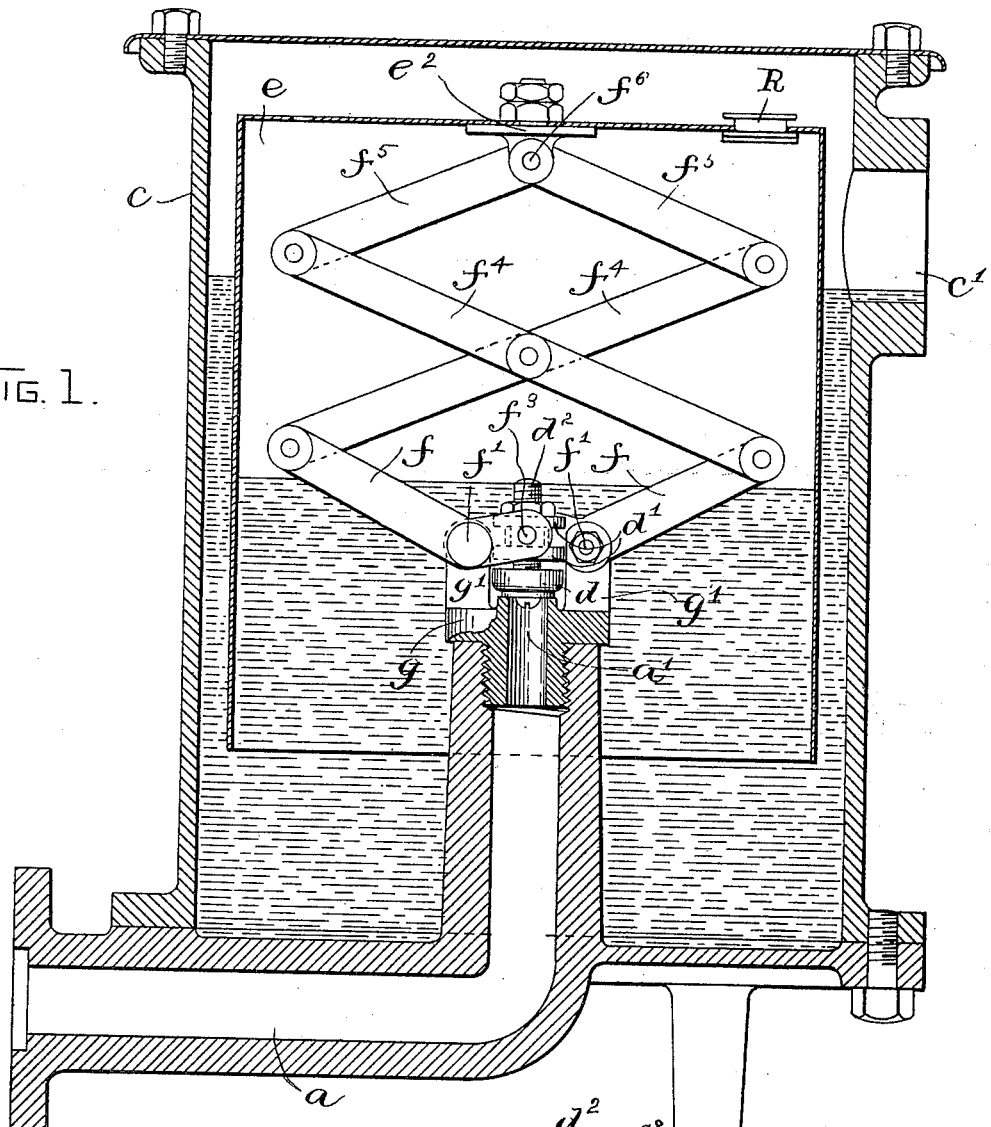
Figure 2:
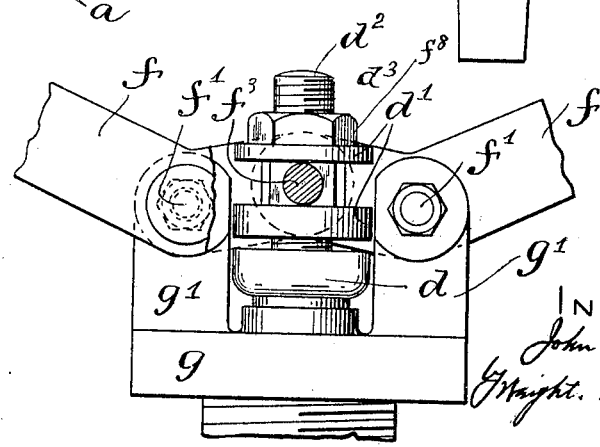

In the accompanying drawings, forming part of this specification, Figure 1 represents a vertical sectional view of a steam-trap constructed in accordance with my invention. Fig. 2 represents an enlarged detail view of the valve and connections with parts broken away. Fig. 3 represents a view similar to Fig. 1, showing the valve in an open position. Fig. 4 represents a view similar to Fig. 2, showing a modification.

The same reference characters indicate like parts in all the figures.

Referring to the drawings, $a$ represents a conduit which receives water and steam from a boiler or system of piping through a suitable pipe, the said conduit being here shown as having a substantially horizontal portion and a substantially vertical portion, the latter being secured to and passing through the bottom of a receptacle $c$. The conduit $a$ has an outlet $a'$, surrounded by a valve-seat, on which a valve $d$ is adapted to close to prevent the escape of steam through the outlet $a'$. When the valve is open, matter passing through the outlet $a'$ escapes into the receptacle $c$.

$e$ represents a chamber or float adapted to rise and fall in the receptacle $c$, said float being closed at its upper end and open at its lower end.

$g$ represents an annular yoke or nozzle in which the outlet $a'$ is located, said yoke being formed with upwardly-projecting ears $g'$ $g'$ on either side of the valve $d$, and at the top of said ears, pivoted to studs $f'$ $f'$, are levers $f$ $f$, diverging toward opposite sides of the float $e$. At their inner ends said levers are loosely engaged with pins $f^3$, projecting laterally from blocks $f^8$, Fig. 2, which operate in a circumferential groove formed in a block $d'$. The latter is internally threaded and engaged with the threaded valve-stem $d^2$, being adjustable thereon to allow for wear and locked in place by means of a lock-nut $d^3$. The outer ends of the levers $ff$ are pivotally connected with levers $f^4$ $f^4$, which are crossed at their middle points and pivotally connected thereat, and the said levers $f^4$ are in turn pivoted or connected at their upper ends with a third set of levers $f^5$ $f^5$, which are pivoted at $f^6$ to a boss $e^2$, bolted to the top of the float $e$. The whole series of levers forms what are commonly known as "lazy-tongs," which when extended will cause a downward movement of the valve toward its seat. When the said lazy-tongs are contracted or flattened out, the valve is raised from its seat. It will readily be seen that the up-and-down movement of the float $e$ will produce such extension and contraction of the lazy-tongs and the consequent operation of the valve.

The operation of the above-described apparatus is as follows: The receptacle $c$ must be first filled with water up to the level of its outlet or overflow $c'$. The connection between the conduit $a$ and the piping or boiler may then be opened and the steam turned on. The float $e$ being depressed and the valve $d$ consequently open, the air which is driven before the steam escapes from the conduit $a$ into the float and receptacle c through the small valve R in the top of the float. Water follows the air and is added to the supply already in the receptacle c, causing an overflow through the outlet c', the water finding its way under the lower end of the float e. The water gradually becomes hotter and hotter, heating the vertical portion of the conduit a until by the time the water in immediate contact with the steam arrives in the lower portion of said conduit the water surrounding the vertical portion of the conduit is above the boiling-point and low-pressure steam is given off within the float e in sufficient quantity to close the float R and raise the float and close the valve d. The inflow being checked, the temperature of the water is reduced, and the pressure being reduced within the float e the said float falls by its own weight, causing the opening of the valve d and letting more water escape from the conduit into the receptacle c. These oscillations of the float continue for a few minutes, gradually diminishing in amplitude until the float assumes a fixed position and remains stationary. The whole apparatus is then in equilibrium, the valve d having adjusted itself and regulated the outlet of the conduit, so as to just permit under the pressure of the steam, whatever it may be, the outflow of the water of condensation at the same rate as that at which it forms, neither more nor less being allowed to flow.

It will be seen from the above that the valve-operating mechanism is very compact, is entirely contained within the float e, and operates with a minimum of friction to raise and depress the valve.

When there is undue friction in the mechanism required to operate the valve in a trap of this character, so much power is required to raise the float that the water in said float is sometimes depressed below its edge and steam escapes into the outer receptacle, thereby impairing the proper working of the trap. My present invention obviates the objections arising from such undue friction, the water being always at a considerable height inside the float e.

I do not confine myself to the particular method shown for transmitting motion from the levers $ff$ to the valve d. Any other suitable arrangement may be employed—such as that, for instance, shown in Fig. 4, wherein the block d', attached to the valve-stem, is formed with horizontal gear-teeth which mesh with gear-segments $f^7$, formed on the ends of the levers $f$.

Owing to the fact that the lazy-tong levers form the sole means for guiding the float the said float rises and falls in a straight line and enables the casing to be constructed very slightly larger than the float, thus leaving but a small space between the walls of the float and casing, from which space the water of condensation is quickly expelled, and since the said lazy-tong or lever connections are entirely within the float there are no pivotal or other openings in the float to require packed joints to prevent escape of steam, which packed joints would interfere with the sensitiveness of the operation of the trap.

I claim—

1. A steam-trap comprising a water-receptacle, a conduit for steam and water entering said receptacle and having an outlet therein, a float vertically movable in a straight line within the receptacle and inclosing said outlet, a non-rotary valve located within the float and adapted to open and close the outlet, and a lever pivotally mounted within the float having connection with said float and with the valve and adapted to operate the latter when the float moves, the vertical movements of the float being guided solely by said lever connections.

2. A steam-trap comprising a water-receptacle, a conduit for steam and water having an outlet in said receptacle, a valve adapted to open and close said outlet, a float adapted to rise and fall in a straight line in the receptacle and inclosing said outlet, and lazy-tongs connecting the valve and float and adapted to close the outlet when the float rises and open the outlet when the float falls, the said lazy-tongs guiding the float in its vertical movements.

3. A steam-trap comprising a water-receptacle, a conduit for steam and water entering said receptacle and having an outlet therein, a float having a vertical movement in a straight line in the receptacle and inclosing said outlet, a valve located within the float and adapted to open and close said outlet, the levers $ff$ pivoted to a fixed support and engaging the valve, and lazy-tongs connected with said levers and with the top of the float, whereby the valve is closed by the rising of the float and opened by the depression thereof, the said lazy-tongs guiding the float in its vertical movements.

In testimony whereof I have affixed my signature in presence of two witnesses.

JOHN WILLIAM NASMITH.

Witnesses:
JOHN P. PARRISH,
GEORGE R. DAVIS.